July 3, 1956 G. L. ALLERTON ET AL 2,752,661

FORMING CIRCUIT FOR SEMI-CONDUCTIVE TRANSLATING DEVICES

Filed Oct. 28, 1952

2 Sheets-Sheet 1

INVENTORS
G. L. ALLERTON
G. L. PRUDHON
BY W. C. Parnell
ATTORNEY

July 3, 1956 G. L. ALLERTON ET AL 2,752,661

FORMING CIRCUIT FOR SEMI-CONDUCTIVE TRANSLATING DEVICES

Filed Oct. 28, 1952

2 Sheets-Sheet 2

INVENTORS
G. L. ALLERTON
G. L. PRUDHON
BY W. C. Parnell
ATTORNEY

United States Patent Office 2,752,661

Patented July 3, 1956

2,752,661

FORMING CIRCUIT FOR SEMI-CONDUCTIVE TRANSLATING DEVICES

George L. Allerton and Glenn L. Prudhon, Allentown, Pa., assignors to Western Electric Company, Incorporated, New York, N. Y., a corporation of New York Application October 28, 1952, Serial No. 317,342

6 Claims. (Cl. 29—25.3)

This invention relates to improvements in circuits for electrically forming transistors of the general type such as disclosed in Patent 2,524,035 granted October 3, 1950, to J. Bardeen and W. H. Brattain and particularly to improvements in forming circuits using forming pulses.

In transistor forming circuits such as those disclosed in the application of A. E. Anderson, Serial No. 250,160, filed October 6, 1951, the collector electrode region of the semi-conductor body is electrically formed by passing pulses of electrical energy through the collector to base electrode circuit while the emitter is connected in circuit with the base and energized so that a current is flowing therein. Such a circuit is shown in Fig. 1 of the aforementioned application. In this circuit, the three electrode transistor being processed besides having an energized emitter to base circuit also has a quiescent current flowing in its collector to base circuit. The forming energy is obtained by discharging a charged condenser and superimposing the discharge on this quiescent current through switching means.

It has been discovered that most switches and relays capable of switching the high voltages required in forming (as high as 1500 volts) exhibit considerable contact chatter or bounce and produce a ragged forming pulse. Attempted forming, using such means, frequently results in burning the contacting point of the collector electrode and, in cases where the switch chatter is not sufficient to destroy the collector electrode, it has been found that the electrical characteristics of the formed transistors vary considerably. To overcome this, heavy duty toggle switches of the three position type have been satisfactorily used on an experimental basis, however, such a switch is not practicable for production processing where, from a standpoint of operator fatigue, it is desirable to initiate the pulse with a light pressure push button switch.

It is therefore, the principal object of this invention to reduce the loss of transistors in the forming process, to improve the consistency of the formed characteristics of the transistors and to facilitate the forming operation.

According to the general features of the invention a charged, forming pulse capacitor is connected to the collector circuit through the contacts of two relays, one relay being of a fast operating mechanical type and the other being of a slow operating mercury type (having mercury wetted contacts). By pressing a push button initiating switch, the mechanical relay is energized thereby connecting the charged capacitor to the contacts of the mercury relay. At the same time, other contacts on the mechanical relay energize the mercury relay which, in turn, actuates after its time delay. The time delay permits the mechanical contact bounce of the mechanical relay to cease before the mercury relay finally completes the circuit, thus closing the forming pulse circuit. Mercury wetted contacts are well suited for closing the circuit since they have negligible contact bounce or chatter. Upon release of the initiating switch, the mechanical relay releases first and breaks the circuit cleanly and re-establishes the forming pulse capacitor charging path through its back contacts. The function of breaking the forming pulse circuit cannot be accomplished by the mercury relay since on release, mercury type relay contacts have a tendency to bridge across and thereby produce secondary pulses.

In accordance with an important feature of the invention, a relay operated protective grounding circuit prevents operation of the forming circuit if the grounded base electrode circuit of the transistor is open. This eliminates the possibility of exposing the operator to the high potential pulsing voltage which might otherwise be present on the transistor jacket or sleeve.

These and other objects and features of this invention will be more readily understood from the following detailed description when read in conjunction with the accompanying drawings in which.

Figure 1:
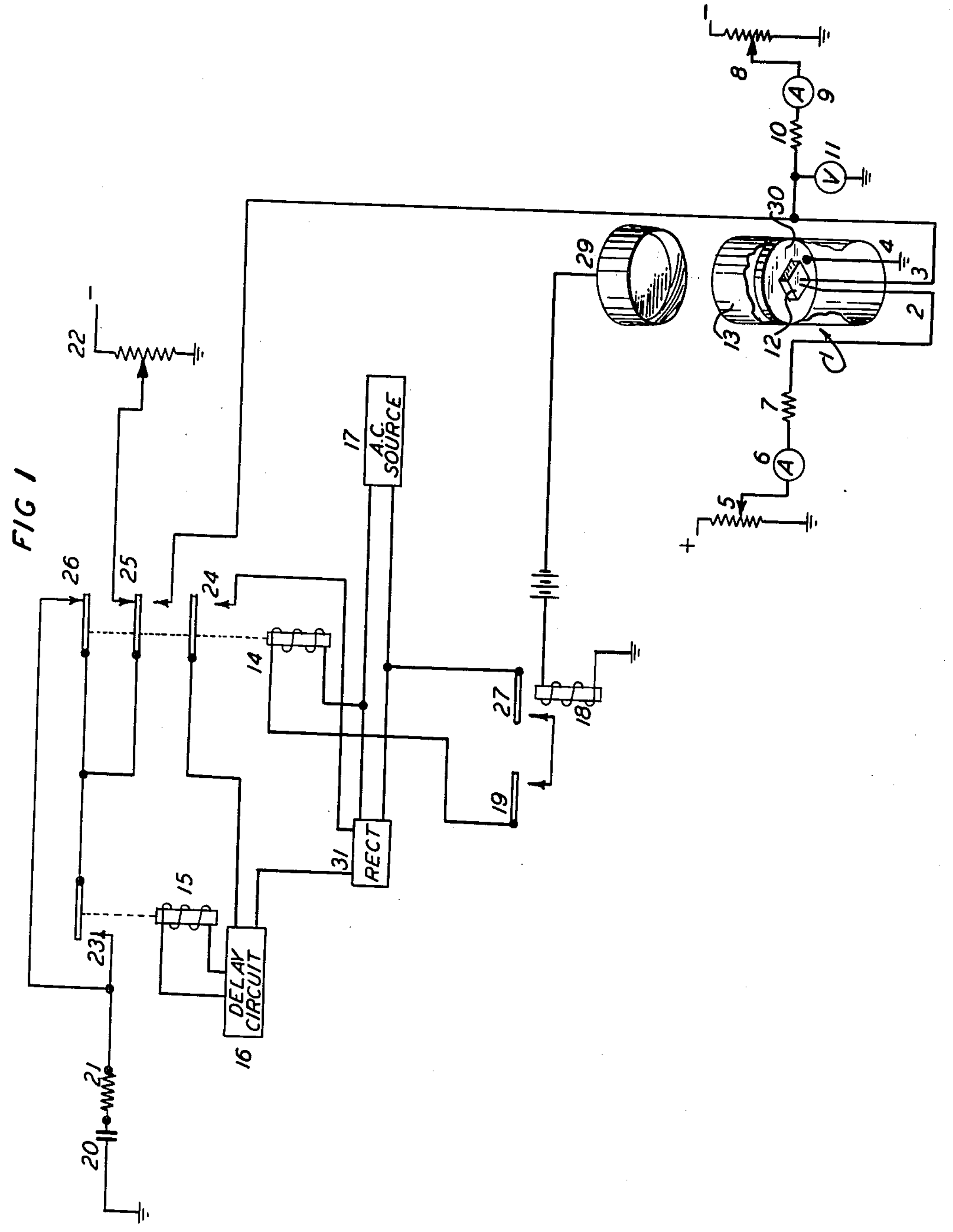
Fig. 1 is a simplified schematic diagram of a typical transistor forming circuit utilizing the principles of the invention.

Referring now to Fig. 1, the transistor 1 being formed has its base electrode 4 connected to ground potential, its emitter electrode 2 connected through a series resistance 7 and a milliammeter 6 to a potentiometer 5 and its collector electrode 3 connected through a series resistance 10 and a milliammeter 9 to potentiometer 8. The transistor semi-conductor body 12 is of "N" type and the polarity of the sources energizing potentiometers 5 and 8 are such that the emitter 2 and the collector 3 are biased in the forward and the reverse directions, respectively. Quiescent currents for the emitter and collector circuits, as prescribed by predetermined specifications, are established by adjusting the potentiometers 5 and 8, respectively.

The pulsing capacitor 20 is charged through current limiting resistor 21, normally closed contacts 26 and 25 of relay 14 and potentiometer 22. In order to discharge capacitor 20, an operator's protective circuit must first be operated. This circuit operates when cap 29 is attached to the metallic transistor sleeve 13 which, in turn, is electrically connected to the grounded base electrode 4 through the conductive mounting plate 30 thereby energizing relay 18 and closing contacts 27. This circuit protects the operator from exposure to the high pulsing potential which might reside on the sleeve 13 in the event the base electrode 4 circuit to ground is open. When the safety circuit is operated, a pulse is initiated by actuating the light pressure push button snap action switch 19 which closes the relay 14 energizing circuit through the A. C. source 17. This relay 14 is a fast operating mechanical type relay. When operated, the contacts 24 of relay 14 cause the D. C. mercury type relay 15 to be energized through the rectifier 31 and time delay circuit 16. This time delay circuit introduces sufficient delay to permit mechanical contact bounce of relay 14 to cease before the mercury wetted contacts 23 complete the circuit connecting the capacitor 20 to the collector 3 of the transistor. The mercury type relay 15 is of the Western Electric 275B type and requires an external delay circuit 16 and a rectifier 31. This relay is of the general type disclosed in Patent 2,289,830 granted July 14, 1942, to W. B. Ellwood and utilizes contacts similar to those disclosed in Patent 2,302,546 granted November 17, 1942, to H. C. Harrison. A different type of mercury wetted contact relay which is inherently slow acting may also be used.

Figure 2:
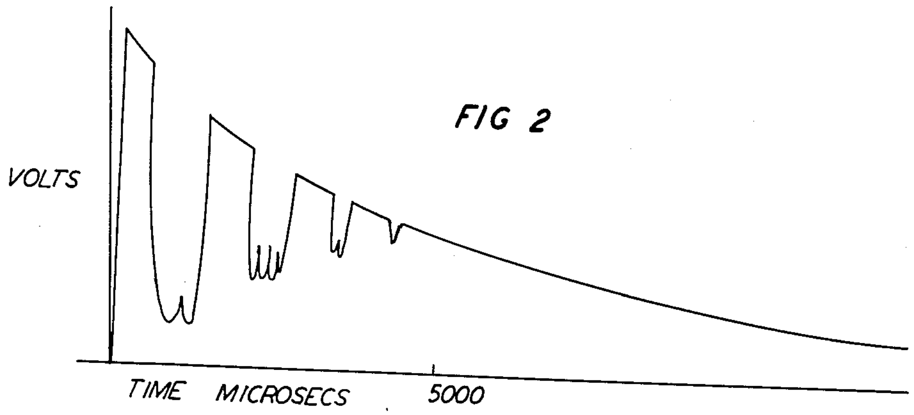
Figs. 2 and 3 are curves showing the effect of contact chatter on the forming pulse.
Figure 3:
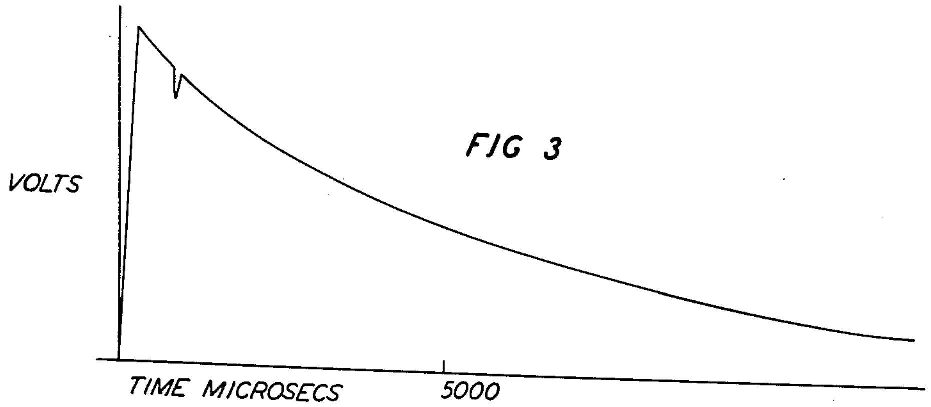

Fig. 2 shows a typical ragged waveform of a forming pulse resulting when the circuit is closed by a mechanical relay (similar to relay 14) or by a spring loaded snap action switch. Fig. 3 shows an improved, smooth waveform resulting from the use of a relay having mercury wetted contacts as discussed above.

To disconnect the forming pulse capacitor 20 from the collector circuit, the initiating switch 19 is released thereby removing the excitation from relay 14 causing it to release. Contacts 25 thereupon cleanly break the pulsing circuit and re-establish the capacitor 20 charging path through its back contacts 25 and 26. With the release of relay 14, contacts 24 also open thereby de-energizing relay 15. Since the circuit to the collector electrode 3 has already been cleanly broken through contacts 25 of relay 14, the problem of the mercury wetted contacts bridging over to produce a secondary pulse is avoided.

While the invention has been described with respect to a particular embodiment for purposes of illustration, it will be understood that the system shown could be modified in various ways in accordance with the general principles of the invention and the requirements of the particular conditions of use. For example, if the transistor semi-conductor body 12 was of "P" conductivity type, the polarity of the forming pulse, as determined by the polarity of potentiometer 22, as well as the polarity of the bias on the emitter and collector electrodes would have to be reversed; a simple switching system could be utilized for this purpose. Also, in order to vary the energy level of the forming pulse, a number of different size capacitors and resistors corresponding to capacitor 20 and resistor 21, respectively, could be arranged to be switched into the pulsing circuit in any combination depending on the size of the energy pulse desired. The emitter to base and collector to base circuits may also be varied and contain means for detecting the progress of forming and automatic control circuits may be included for maintaining quiescent voltages and currents. This circuit could also be adapted for use in forming phototransistors, in which case a controlled light flux circuit would be substituted for the emitter circuit. Numerous other arrangements may be devised by those skilled in the art without departing from the spirit and the scope of the invention.

What is claimed is:

1. In a system for electrically forming a transistor having a semiconductor body and at least base and collector electrodes connected thereto, wherein a condenser of known capacity is charged to a predetermined potential and discharged through a path including the collector and base electrodes, means for producing a discharge current of smooth waveform comprising a first, fast operating, fast releasing mechanical relay, a circuit including a switch for operating the relay, a second, slow operating relay controlled by the first relay and having mercury wetted contacts and normally open contacts on both relays serially connected in the discharge path of the condenser.

2. In a system according to claim 1 wherein the transistor has a metal sleeve covering connected to the base electrode, an operator protecting circuit for disabling the switch until the base electrode is connected to ground comprising a relay having a grounded operating winding, a sleeve contacting cap, normally open contacts in series with the switch and a source of current for energizing the winding connected thereto and to the sleeve contacting cap.

3. In a system for electrically forming a transistor having a semiconductor body and at least base and collector electrodes connected thereto, a source of electrical energy and means for applying to the collector a pulse of energy of smooth waveform from the said source said means comprising a fast acting mechanical relay, normally open contacts for the relay, a slow acting relay having normally open, mercury wetted contacts, a source of power for the relays, means for connecting the source of power to the fast acting relay, contacts on the fast acting relay for connecting the slow acting relay to the source when the fast acting relay is operated, and a circuit including the normally open contacts of the relays for connecting the source of electrical energy to the collector, said circuit being closed upon the closing of the mercury wetted contacts.

4. Apparatus for electrically forming a transistor having a semiconductor body and emitter, base and collector connections thereto comprising means for producing a current between the emitter and base connections, means for producing a current between the collector and base connections, a source of electrical pulses and means for applying a pulse from the source to the collector connection with a smooth waveform comprising a fast acting mechanical relay, normally open contacts for the relay, a source of electrical power, means for applying the source of electrical power to the fast acting relay, a slow acting relay having normally open mercury wetted contacts, contacts on the fast acting relay for connecting the slow acting relay to the source of electrical power when the fast acting relay is actuated, and a circuit including the normally open contacts of the relays for connecting the source of electrical pulses to the collector said circuit being closed when the mercury wetted contacts are closed and opened when the contacts of the fast acting relay are opened.

5. A system according to claim 1 having a charging circuit for the condenser including normally closed contacts on the fast operating relay for opening the charging circuit when the condenser is being discharged.

6. In a system for electrically forming a transistor having a semi-conductor body and at least base and collector electrodes connected thereto, a source of electrical energy and means for applying to the collector a pulse of energy of smooth waveform from the said source said means comprising a fast acting mechanical relay, normally open contacts for the relay, a slow acting relay having normally open, mercury wetted contacts, a source of power for the relays, means for connecting the source of power to the fast acting relay, contacts on the fast acting relay for connecting the slow acting relay to the source when the fast acting relay is operated, a circuit including the normally open contacts of the relays for connecting the source of electrical energy to the collector, said circuit being closed upon the closing of the mercury wetted contacts and an operator protecting circuit for disabling the fast operating relay until the base electrode is connected to ground comprising a relay having a grounded operating winding and normally open contacts in series with the switch and a source of current for energizing the winding connected thereto and to the base electrode.

References Cited in the file of this patent

UNITED STATES PATENTS

| | | |
|---|---|---|
| 2,342,821 | Reagan | Feb. 29, 1944 |
| 2,634,323 | Pantchecknikoff | Apr. 7, 1953 |